(12) United States Patent
Li et al.

(10) Patent No.: US 8,856,864 B2
(45) Date of Patent: Oct. 7, 2014

(54) DETECTING, ENFORCING AND CONTROLLING ACCESS PRIVILEGES BASED ON SANDBOX USAGE

(71) Applicant: Intel Corporation, Santa Clara, CA (US)

(72) Inventors: Hong Li, El Dorado Hills, CA (US); Tobias M. Kohlenberg, Portland, OR (US); Rita H. Wouhaybi, Portland, OR (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/628,221

(22) Filed: Sep. 27, 2012

(65) Prior Publication Data
US 2014/0090008 A1    Mar. 27, 2014

(51) Int. Cl.
*G06F 17/00*    (2006.01)
*H04L 29/06*    (2006.01)

(52) U.S. Cl.
USPC .............................................. 726/1; 713/151

(58) Field of Classification Search
CPC ... H04L 63/20; H04L 63/102; H04L 63/0227; G06F 21/6218; G06F 21/604
USPC .............. 726/1, 2, 3, 4, 27, 29; 713/151, 152, 713/170, 171, 187
See application file for complete search history.

(56) References Cited

U.S. PATENT DOCUMENTS

| | | | |
|---|---|---|---|
| 7,346,649 B1 * | 3/2008 | Wong | 709/203 |
| 7,870,596 B2 * | 1/2011 | Schackow et al. | 726/1 |
| 8,051,491 B1 * | 11/2011 | Cavage et al. | 726/30 |
| 2002/0107809 A1 * | 8/2002 | Biddle et al. | 705/59 |
| 2005/0021467 A1 * | 1/2005 | Franzdonk | 705/51 |
| 2005/0193380 A1 * | 9/2005 | Vitanov et al. | 717/143 |
| 2006/0031833 A1 | 2/2006 | Huang et al. | |
| 2008/0189757 A1 * | 8/2008 | Schackow et al. | 726/1 |
| 2008/0189767 A1 * | 8/2008 | Kothari et al. | 726/4 |
| 2009/0132680 A1 | 5/2009 | Yamamoto et al. | |
| 2010/0138896 A1 | 6/2010 | Honda | |
| 2010/0180330 A1 * | 7/2010 | Zhu et al. | 726/10 |
| 2010/0217976 A1 * | 8/2010 | Ju et al. | 713/165 |
| 2010/0268757 A1 | 10/2010 | Fisher | |
| 2012/0002637 A1 | 1/2012 | Adjakple et al. | |
| 2012/0151369 A1 * | 6/2012 | Kominac et al. | 715/740 |
| 2012/0204250 A1 * | 8/2012 | Anderson et al. | 726/9 |
| 2013/0042190 A1 * | 2/2013 | Ciloci | 715/764 |
| 2013/0060905 A1 * | 3/2013 | Mickens et al. | 709/219 |
| 2013/0283182 A1 * | 10/2013 | Dadu et al. | 715/740 |
| 2014/0006548 A1 * | 1/2014 | Tsolis et al. | 709/217 |

OTHER PUBLICATIONS

Bennet et al , Native client: a sandbox for portable , untrusted x86 native code, Google inc, IEEE, 2009, pp. 1-15.*

(Continued)

*Primary Examiner* — Abu Sholeman
(74) *Attorney, Agent, or Firm* — Jordan IP Law, LLC

(57) ABSTRACT

Systems and methods may provide for receiving web content and detecting an access control attribute associated with the web content. Additionally, the access control attribute may be monitored for a disablement condition. In one example, the disablement condition may be detected, an access policy may be determined in response to the disablement condition, and the access policy may be implemented.

23 Claims, 3 Drawing Sheets

(56) References Cited

OTHER PUBLICATIONS

International Search Report and Written Opinion received for PCT Patent Application No. PCT/US2013/059348, mailed on Dec. 30, 2013, 9 pages.

HTML5; A vocabulary and associated APIs for HTML and XHTML; W3C Candidate Recommendation Aug. 6, 2013. 19 pages.

HTML5; A vocabulary and associated APIs for HTML and XHTML; Editor's Draft Jan. 28, 2014. 20 pages.

\* cited by examiner

DETECTING, ENFORCING AND CONTROLLING ACCESS PRIVILEGES BASED ON SANDBOX USAGE

BACKGROUND

Embodiments generally relate to access controls for web-based applications. More particularly, embodiments relate to detecting, enforcing and controlling access privileges to non-native web applications.

HTML5 (Hypertext Markup Language 5, e.g., HTML5 Editor's Draft 8 May 2012, World Wide Web Consortium/W3C, www*w3*org) is an emerging markup language that may support more robust multimedia related web platform development and the combining of more functional web content from different sources. The use of HTML5 by an application developer, however, may also expose the control of certain features and/or functionality of the web content such as advertisements, pop-ups, widgets, and scripts to other web applications as well as end users, wherein the exposure of such control may lead to security concerns. For example, a sandbox may be a set of rules that are used when creating an application in order to prevent certain functions when the code is sent as part of a Web page. Additionally, a sandbox may restrict an application from accessing other applications inside the browser and random client resources (e.g., a code isolation tool in the context of software development). Undetected malware may disable the HTML5 sandbox attribute in order to capture sensitive user data stored, for example, on the hard drive. Moreover, users may disable the sandbox attribute without fully understanding the ramifications of disablement (e.g., loss of desired functionality).

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
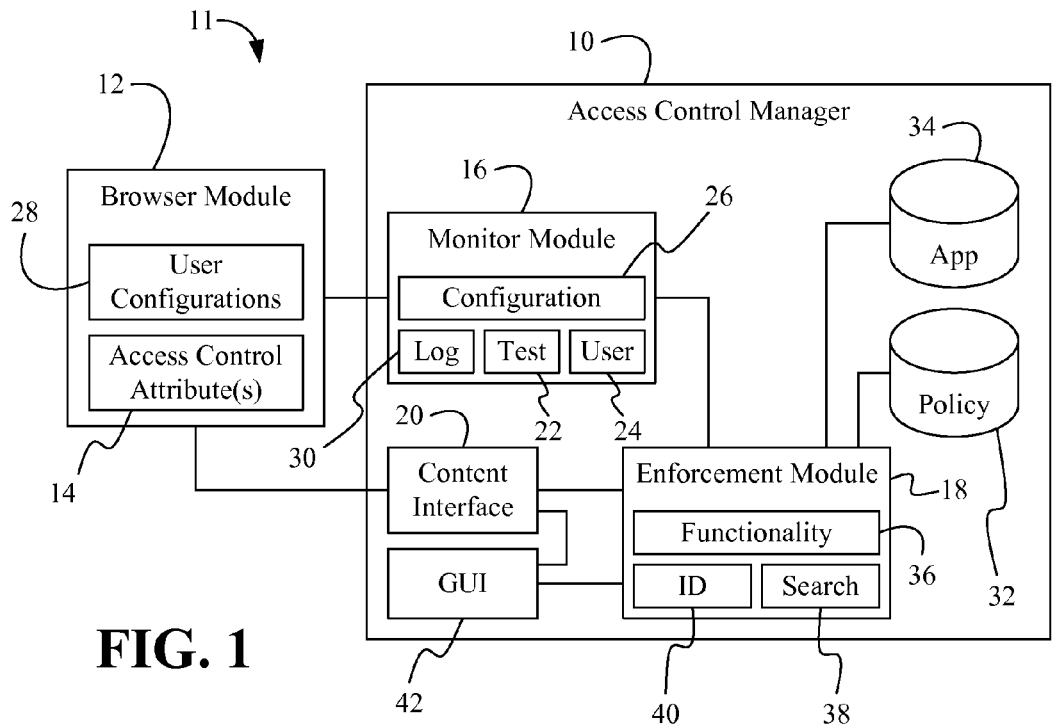
FIG. 1 is a block diagram of an example of an access control architecture according to an embodiment.

Turning now to FIG. 1, an access control architecture 11 is shown in which an access control (e.g., sandbox) manager 10 is used to detect, enforce and control access privileges with regard to web applications and content. In the illustrated example, a browser module 12 receives web content having one or more associated access control attributes 14 such as an HTML5 sandbox attribute. The access control attribute 14 may allow developers of the web content, which may originate a variety of different sources, to set access privileges for one or more operations/functions associated with the web content. For example, a web site developer may enable the access control attribute 14 in order to ensure that functions such as plug-in instantiation, script execution, pop-up interface generation, form submission, storage access, and so forth, are inoperable from within the browser when users visit the web site in question. Another example, some browsers (e.g., Microsoft Internet Explorer 9/IE9) have an HTML5 sandbox that includes ways for developers to lockdown access control features; that sandbox can be disabled, however, by the developer of web applications. As will be discussed in greater detail, the access control manager 10 may generally detect the enablement of the access control attribute 14 and monitor the access control attribute 14 for a disablement condition. By monitoring the access control attribute 14 for disablement, the illustrated access control manager 10 provides greater protection against malware attacks, enables end users to be more aware of access control ramifications and concerns, and provides more granular privilege options for users when access control is enforced.

More particularly, the access control manager 10 may include a monitor module 16 that detects the disablement condition, an enforcement module 18 that determines an access policy or any other client action in response to the disablement condition, and a content interface 20 that implements the access policy. In one example, the monitor module 16 includes a test component 22 that periodically tests functions such as the ability to instantiate plug-ins, execute scripts, generate pop-up interfaces, submit forms, access storage, and so forth. Additionally, the monitor module 16 may include a user component 24 to determine whether a user action/trigger has occurred with respect to the access control attribute 14, and a configuration component 26 to determine whether a browser configuration setting 28 corresponding to the access control attribute 14 has changed. Moreover, the illustrated monitor module 30 includes a log component 30 to document activity regarding the access control attribute 14. Thus, the disablement condition may be equivalent to the test component 22 being able to perform one or more of the tested functions, the user component 24 detecting a user action with respect to the access control attribute 14, the configuration component 26 determining that the browser configuration setting 28 has changed, etc., or any combination thereof.

In response to the disablement condition, the enforcement module 18 may obtain the access policy from a policy repository 32 and/or application profile repository 34. In this regard, the illustrated enforcement module 18 includes an identification component 40 that is configured to identify a requestor application identity associated with the disablement condition, and a search component 38 that uses the requestor application identity to retrieve at least a portion of the access policy from the application profile repository 34. For example, the application profile repository 34 may contain entries specifying that, when the HTML5 sandbox feature that comes with a web browser is disabled, submission requests from "Application X" to the web site "CustomerApp.html" are allowed, whereas storage accesses or JavaScript requests from unauthenticated applications to the web site "CustomerProfile.html" are disallowed.

Accordingly, the illustrated enforcement module 18 also includes a functionality component 36 that is configured to identify one or more functions associated with the web content, wherein the search component 38 may use the one or more functions to retrieve at least a portion of the access policy from the policy repository 32. For example, the functionality component 36 might determine that the web content includes a form, and therefore search the policy repository 32 for form submission guidelines to determine a course of action to be taken when certain sandboxing features are disabled. The search of the application profile repository 34 may also take into consideration the web content functions, and the search of the policy repository 32 may take into consideration the requestor application identity. Moreover, application granularity may be based on web site address (e.g., CustomerApp.html versus CustomerProfile.html). Of particular note is that the logging of sandboxing disablement activities by the log component 30 may also vary depending upon the access policy. Such an approach may be particularly advantageous for investigations, forensics and reputation information systems.

Implementing the access policy may include, for example, automatically enabling the access control attribute 14. In another example, implementing the access policy may involve determining that the access control attribute cannot be enabled without impacting the web content, and either disallowing the web content or applying another/differential controls. The access policy may also call for generating user notification via a graphical user interface (GUI) 42, wherein the user notification includes an identification of the disablement condition as well as a recommended action. For example, the user notification might explain that cross-origin storage accesses (e.g., storage accesses across applications) have been enabled even though the web developer of the site being visited had used the access control attribute 14 to protect against such functionality. Such a user notification may also explain the malware concerns associated with permitting such functionality. The content interface 20 may receive a response to the user notification and determine whether to modify the access control attribute 14 based on the response.

For example, if a user does not want their behavior on a social networking site to be cached and used by an online retailer, the user may enforce a tighter policy on the respective access control attributes of the social networking site and the online retailer—overwriting what the developers of these applications had originally indicated. Thus, although the access control manager 10 may offer recommendations, the user may remain in the security privilege decision loop.

Figure 2:
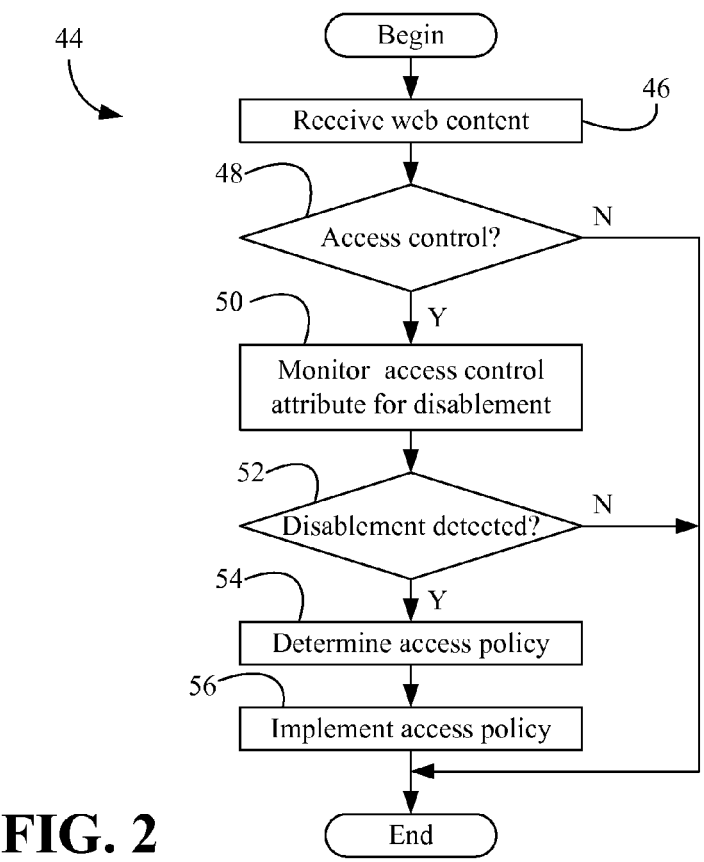
FIG. 2 is a flowchart of an example of a method of managing web based access controls according to an embodiment.

Turning now to FIG. 2, a method 44 of managing web based access controls is shown. The method 44 may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 44 may be written in any combination of one or more programming languages, including an object oriented programming language such as C++ or the like and conventional procedural programming languages, such as the "C" programming language or similar programming languages. Moreover, the method 44 may be implemented as the access control architecture 11 (FIG. 1) using any of the aforementioned circuit technologies.

Illustrated processing block 46 provides for receiving web content, wherein the web content may originate from different sources (e.g., web servers, client side applications, service providers, etc.). Moreover, the web content may include one or more functions such as the ability to instantiate plug-ins, execute scripts, generate pop-up interfaces, submit forms, access storage, and so forth. For example, script execution may originate from a media player JavaScript application (a first source) embedded in an iframe on a web page from an online retailer (a second source). Block 48 may provide for determining whether an access control attribute has been enabled. The access control attribute may be, for example, an HTML5 sandbox attribute that prevents cross-origin script execution, etc., when enabled. Thus, the access control attribute might be enabled by the online retailer/second source in the above example. If the access control attribute is detected, illustrated block 50 monitors the access control attribute for a disablement condition, which may result from another application such as the media player JavaScript application/first source in the above example turning off the access control in order to ensure that the media is played correctly. The disablement condition may also result from malware or a user action.

If the disablement condition is detected at block 52, illustrated block 54 provides for determining an access policy. The access policy may be obtained from a policy repository and/or profile repository, as already discussed. Block 56 may implement the access policy, which may involve automatically enabling the access control attribute, disallowing the web content (e.g., if the access control attribute cannot be enabled without impacting the web content), generating a user notification, determining whether to modify the access control attribute based on a response to the user notification, and so forth.

Figure 3:
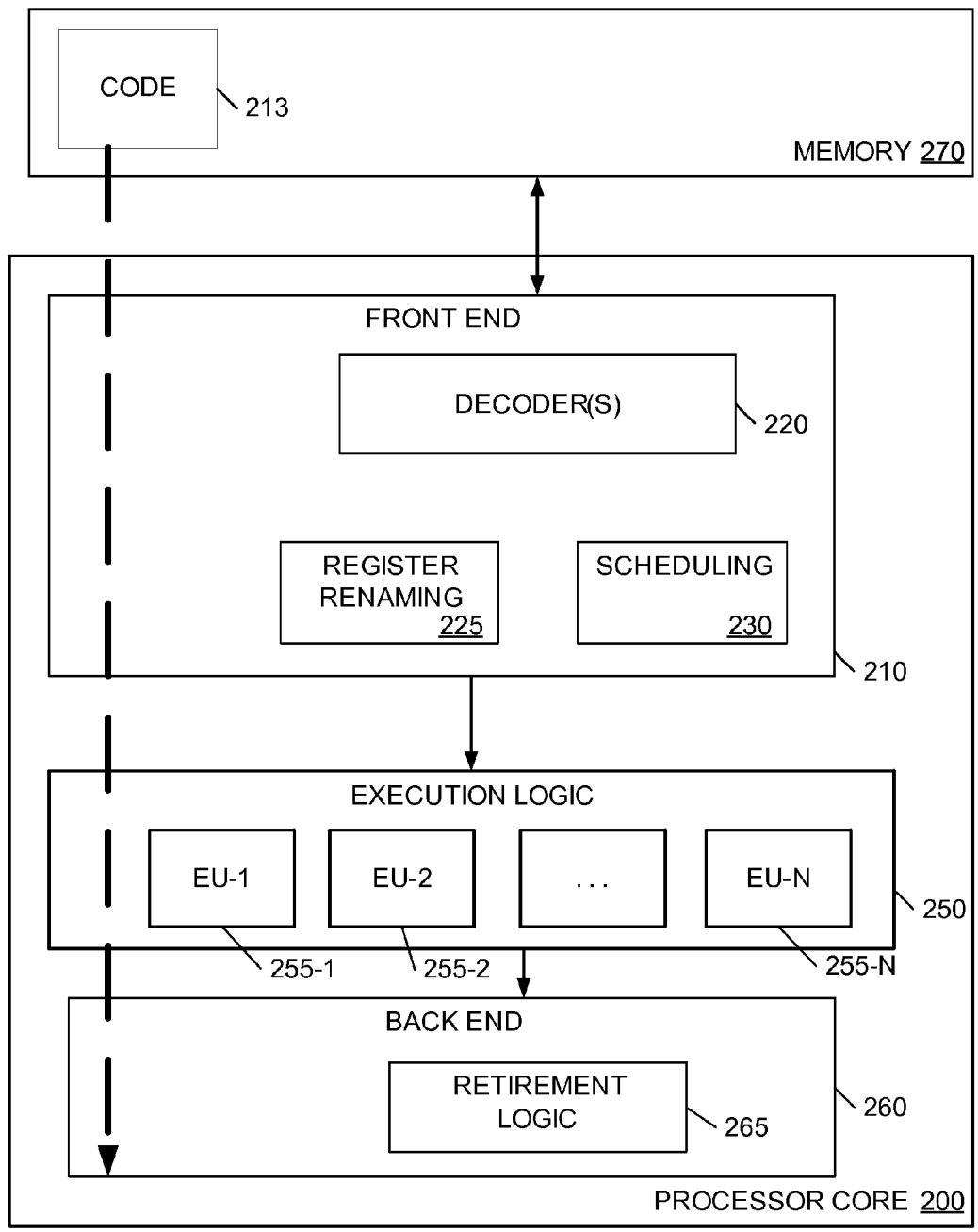
FIG. 3 is a block diagram of an example of a processor according to an embodiment.

FIG. 3 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 3, a processing element may alternatively include more than one of the processor core 200 illustrated in FIG. 3. The processor core 200 may be a single-threaded core or, for at least one embodiment, the processor core 200 may be multithreaded in that it may include more than one hardware thread context (or "logical processor") per core.

FIG. 3 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the access control architecture 11 (FIG. 1), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 3, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 4:
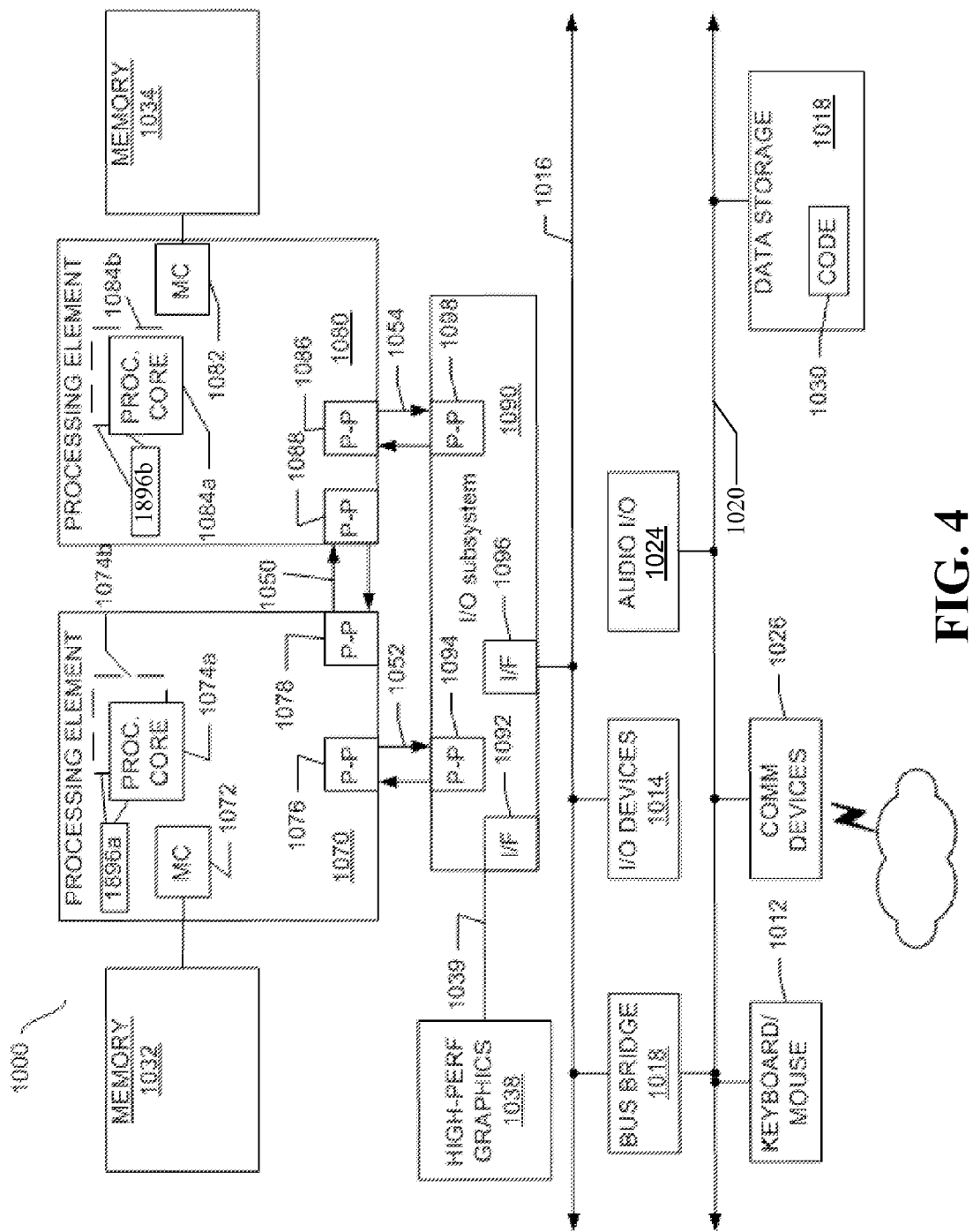
FIG. 4 is a block diagram of an example of a system according to an embodiment.

Referring now to FIG. 4, shown is a block diagram of a system embodiment 1000 in accordance with an embodiment of the present invention. Shown in FIG. 4 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 4 may be implemented as a multi-drop bus rather than point-to-point interconnect.

As shown in FIG. 4, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 3.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 4, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 4, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 4, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1018 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the logic architecture 11 (FIG. 1) and may be similar to the code 213 (FIG. 3), already discussed. Further, an audio I/O 1024 may be coupled to second bus 1020.

Note that other embodiments are contemplated. For example, instead of the point-to-point architecture of FIG. 4, a system may implement a multi-drop bus or another such communication topology. Also, the elements of FIG. 4 may alternatively be partitioned using more or fewer integrated chips than shown in FIG. 4.

ADDITIONAL NOTES AND EXAMPLES

Example one may therefore include a method to manage web-based security in which web content is received, and an access control attribute associated with the web content is detected. The method may also provide for monitoring the access control attribute for a disablement condition.

Additionally, the method of example one may further include detecting the disablement condition, determining an access policy in response to the disablement condition, and implementing the access policy.

Additionally, implementing the access policy in example one may include enabling the access control attribute.

Moreover, implementing the access policy in example one may include generating a user notification, wherein the user notification includes an identification of the disablement condition and a recommended action, receiving a response to the user notification, and determining whether to modify the access control attribute based on the response.

In addition, the method in example one may further include identifying one or more functions associated with the web content, and using the one or more functions to retrieve at least a portion of the access policy from a policy repository.

In addition, the method in example one may further include identifying a requestor application identity associated with the disablement condition, and using the requestor application identity to retrieve at least a portion of the access policy from the profile repository.

Moreover, monitoring the access control attribute in example one may include periodically testing one or more functions associated with the web content, determining whether a user action has occurred with respect to the access control attribute, determining whether a browser configuration setting corresponding to the access control attribute has changed, and documenting activity regarding the access control attribute.

Additionally, the access control attribute of any of the aforementioned example one methods may be a Hypertext Markup Language 5 (HTML5) sandbox attribute.

Example two may also include at least one computer readable storage medium having a set of instructions which, if executed by a processor, cause a computing device to perform any of the above method examples.

Example three may also include a web-based security apparatus having a browser module to receive web content and a security manager to detect an access control attribute associated with the web content. The security manager may also monitor the access control attribute for a disablement condition.

Additionally, the security manager in example three may include a monitor module to detect the disablement condition, an enforcement module to determine an access policy in response to the disablement condition, and a content interface to implement the access policy.

Additionally, the content interface in example three may enable the access control attribute.

Moreover, the content interface may determine that the access control attribute cannot be enabled without impacting the web content, and disallow the web content.

In addition, the enforcement module in example three may generate a user notification, wherein the user notification is to include an identification of the disablement condition and a recommended action.

In addition, the content interface in example three may receive a response to the user notification and determine whether to modify the access control attribute based on the response.

Moreover, the apparatus in example three may further include a policy repository, wherein the enforcement module includes a functionality component to identify one or more functions associated with the web content, and a search component to use the one or more functions to retrieve at least a portion of the access policy from the policy repository.

Additionally, the apparatus in example three may further include a profile repository, wherein the enforcement module includes an identification component to identify a requestor application identity associated with the disablement condition, and a search component to use the requestor application identity to retrieve at least a portion of the access policy from the profile repository.

Additionally, the security manager in example three may include a test component to periodically test one or more functions associated with the web content, a user component determine whether a user action has occurred with respect to the access control attribute, a configuration component to determine whether a browser configuration setting corresponding to the access control attribute has changed, and a log component to document activity regarding the access control attribute.

In addition, the apparatus in example three may include a network interface to receive the web content.

In addition, the access control attribute of any of the aforementioned example three apparatuses may be a Hypertext Markup Language 5 (HTML5) sandbox attribute.

Example four may also include a web-based security apparatus having means for receiving web content, means for detecting an access control attribute associated with the web content, and means for monitoring the access control attribute for a disablement condition.

Additionally, the apparatus of example four may further include means for detecting the disablement condition, means for determining an access policy in response to the disablement condition, and means for implementing the access policy.

Additionally, the apparatus of example four may further include means for enabling the access control attribute.

Moreover, the apparatus of example four may further include means for determining that the access control attribute cannot be enabled without impacting the web content, and means for disallowing the web content.

In addition, the apparatus of example four may further include means for generating a user notification, wherein the user notification is to include an identification of the disablement condition and a recommended action.

In addition, the apparatus of example four may further include means for receiving a response to the user notification, and means for determining whether to modify the access control attribute based on the response.

Moreover, the apparatus of example four may further include means for identifying one or more functions associated with the web content, and means for using the one or more functions to retrieve at least a portion of the access policy from a policy repository.

Additionally, the apparatus of example four may further include means for identifying a requestor application identity associated with the disablement condition, and means for using the requestor application identity to retrieve at least a portion of the access policy from a profile repository.

Additionally, the apparatus of example four may further include means for periodically testing one or more functions associated with the web content, means for determining whether a user action has occurred with respect to the access control attribute, means for determining whether a browser configuration setting corresponding to the access control attribute has changed, and means for documenting activity regarding the access control attribute.

Moreover, the access control attribute the apparatus of any one of the aforementioned example four apparatuses may be a Hypertext Markup Language 5 (HTML5) sandbox attribute.

In addition, example five may include a web-based security system having a network interface and a browser module to receive web content via the network interface. The system may also have a security manager to detect an access control attribute associated with the web content, and monitor the access control attribute for a disablement condition. The system may also be configured to include any of the above apparatus examples.

Techniques described herein may therefore detect access control usage on web applications, and enforce its usage when possible so that underlying protections are in place. Additionally, policy based logging may be used for investigations, forensics and reputation information systems. Moreover, differentiated access controls may be achieved in order to provide more granular access privileges based on the content to be protected and/or requestor trustworthiness (e.g., context-aware sandboxing), especially when the user is not able to enforce certain access controls (e.g., HTML5 sandbox that comes with a browser) disabled by web application developers. Indeed, the end user may have full auditing ability and control over individual access privileges as well as the relationships between applications.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
receiving web content;
detecting an access control attribute associated with the web content, wherein the access control attribute is a Hypertext Markup Language 5 (HTML5) sandbox attribute; and
monitoring the access control attribute for a disablement condition, wherein monitoring the access control attribute includes:
periodically testing one or more functions associated with the web content;
determining whether a user action has occurred with respect to the access control attribute;
determining whether a browser configuration current setting of the access control attribute has changed to a setting that is different than the current setting; and
documenting activity regarding the access control attribute.

2. The method of claim 1, further including:
detecting the disablement condition;
determining an access policy in response to the disablement condition; and
implementing the access policy.

3. The method of claim 2, wherein implementing the access policy includes enabling the access control attribute.

4. The method of claim 2, wherein implementing the access policy includes:
generating a user notification, wherein the user notification includes an identification of the disablement condition and a recommended action;
receiving a response to the user notification; and
determining whether to modify the access control attribute based on the response.

5. The method of claim 2, further including:
identifying one or more functions associated with the web content; and
using the one or more functions to retrieve at least a portion of the access policy from a policy repository.

6. The method of claim 2, further including:
identifying a requestor application identity associated with the disablement condition; and
using the requestor application identity to retrieve at least a portion of the access policy from a profile repository.

7. At least one non-transitory computer readable storage medium comprising a set of instructions which, if executed by a processor, cause a computing device to:
receive web content;
detect an access control attribute associated with the web content, wherein the access control attribute is to be a Hypertext Markup Language 5 (HTML5) sandbox attribute; and
monitor the access control attribute for a disablement condition, wherein the computing device is further to:
periodically test one or more functions associated with the web content;
determine whether a user action has occurred with respect to the access control attribute;
determine whether a browser configuration current setting of the access control attribute has changed to a setting that is different than the current setting; and
document activity regarding the access control attribute.

8. The at least one non-transitory computer readable storage medium of claim 7, wherein the instructions, if executed, cause a computing device to:
detect the disablement condition;
determine an access policy in response to the disablement condition; and
implement the access policy.

9. The at least one non-transitory computer readable storage medium of claim 8, wherein the instructions, if executed, cause a computing device to enable the access control attribute.

10. The at least one non-transitory computer readable storage medium of claim 8, wherein the instructions, if executed, cause a computing device to:
determine that the access control attribute cannot be enabled without impacting the web content; and
disallow the web content.

11. The at least one non-transitory computer readable storage medium of claim 8, wherein the instructions, if executed, cause a computing device to generate a user notification, and wherein the user notification is to include an identification of the disablement condition and a recommended action.

12. The at least one non-transitory computer readable storage medium of claim 11, wherein the instructions, if executed, cause a computing device to:
receive a response to the user notification; and
determine whether to modify the access control attribute based on the response.

13. The at least one non-transitory computer readable storage medium of claim 8, wherein the instructions, if executed, cause a computing device to:
identify one or more functions associated with the web content; and
use the one or more functions to retrieve at least a portion of the access policy from a policy repository.

14. The at least one non-transitory computer readable storage medium of claim 8, wherein the instructions, if executed, cause a computing device to:
identify a requestor application identity associated with the disablement condition; and
use the requestor application identity to retrieve at least a portion of the access policy from a profile repository.

15. An apparatus comprising:
a memory;
one or more processors operatively coupled with the memory;
a browser module, implemented using the one or more processors to receive web content; and
a security manager, implemented using the one or more processors to detect an access control attribute associated with the web content, and monitor the access control attribute for a disablement condition, wherein the access control attribute is to be a Hypertext Markup Language 5 (HTML5) sandbox attribute, and wherein the security manager is further to periodically test one or more functions associated with the web content, determine whether a user action has occurred with respect to the access control attribute, determine whether a browser configuration current setting of the access control attribute has changed to a setting that is different than the current setting, and document activity regarding the access control attribute.

16. The apparatus of claim 15, wherein the security manager is further to detect the disablement condition, determine an access policy in response to the disablement condition, and implement the access policy.

17. The apparatus of claim 16, wherein security manager is further to enable the access control attribute.

18. The apparatus of claim 16, wherein the security manager is further to determine that the access control attribute cannot be enabled without impacting the web content, and disallow the web content.

19. The apparatus of claim 16, wherein the security manager is further to generate a user notification, and wherein the user notification is to include an identification of the disablement condition and a recommended action.

20. The apparatus of claim 19, wherein the security manager is further to receive a response to the user notification and determine whether to modify the access control attribute based on the response.

21. The apparatus of claim 16, further including a policy repository, wherein the security manager is further to identify one or more functions associated with the web content, and use the one or more functions to retrieve at least a portion of the access policy from the policy repository.

22. The apparatus of claim 16, further including a profile repository, wherein security manager is further to identify a requestor application identity associated with the disablement condition, and use the requestor application identity to retrieve at least a portion of the access policy from the profile repository.

23. The apparatus of claim 15, further including a network interface to receive the web content.

* * * * *